US012761934B2

(12) United States Patent
Steeves

(10) Patent No.: US 12,761,934 B2
(45) Date of Patent: Oct. 13, 2026

(54) REMOTE DISTRIBUTED UNIT UPDATES

(71) Applicant: DISH Wireless L.L.C., Littleton, CO (US)

(72) Inventor: Daniel Steeves, Lakewood, CO (US)

(73) Assignee: DISH Wireless L.L.C., Littleton, CO (US)

( * ) Notice: Subject to any disclaimer, the term of this patent is extended or adjusted under 35 U.S.C. 154(b) by 853 days.

(21) Appl. No.: 17/831,584

(22) Filed: Jun. 3, 2022

(65) Prior Publication Data

US 2023/0393875 A1 Dec. 7, 2023

(51) Int. Cl.
*G06F 9/455* (2018.01)
*H04L 9/40* (2022.01)

(52) U.S. Cl.
CPC ...... *G06F 9/45558* (2013.01); *H04L 63/0272* (2013.01); *G06F 2009/4557* (2013.01); *G06F 2009/45595* (2013.01)

(58) Field of Classification Search
CPC ......... G06F 9/45558; G06F 2009/4557; G06F 2009/45595; H04L 63/0272
USPC .......................................................... 718/1
See application file for complete search history.

(56) References Cited

U.S. PATENT DOCUMENTS

| | | | | |
|---|---|---|---|---|
| 2011/0023029 A1* | 1/2011 | Diab | G06F 9/45558 | 718/1 |
| 2016/0094447 A1* | 3/2016 | Wang | H04L 45/745 | 370/392 |
| 2019/0320487 A1* | 10/2019 | Khan | H04W 76/27 | |
| 2020/0162348 A1* | 5/2020 | Suthar | H04W 24/02 | |
| 2022/0217704 A1* | 7/2022 | Lekutai | H04W 72/51 | |
| 2022/0256536 A1* | 8/2022 | De Almeida | H04W 72/04 | |
| 2024/0196270 A1* | 6/2024 | Nakazato | H04W 24/02 | |

* cited by examiner

*Primary Examiner* — April Y Blair
*Assistant Examiner* — Justin Che-Chun Tong
(74) *Attorney, Agent, or Firm* — Kilpatrick Townsend & Stockton LLP

(57) ABSTRACT

Various cellular network arrangements for remote distributed unit (DU) updates are presented herein. A base station including a radio unit (RU) and an antenna may be present. A cloud-computing platform including a plurality of centralized units (CUs) may be present. A server system can be present, which can include a first virtual machine (VM) and a second VM installed and executing thereon. The server system can be in communication with the RU at the base station and communicatively connected via a network with the cloud computing platform. The first VM can execute a first DU software package that can configure the first VM to transmit data between the RU and a first CU. The second VM can execute a second DU software package that can configure the second VM to transmit data between the RU and a second CU. The first and second DU software packages can be different.

20 Claims, 5 Drawing Sheets

REMOTE DISTRIBUTED UNIT UPDATES

BACKGROUND

Cellular networks are complex and expensive to build. At a cellular base station (BS), in addition to an antenna and a structure to which the antenna is mounted, various other hardware may typically be present, such as a radio. At a BS in a 5G New Radio (NR) cellular network, a radio unit, which is connected with the antenna, is connected with a distributed unit (DU), which performs processing on data transmitted and received by the radio unit.

SUMMARY

Various embodiments are described related to a cellular network. In some embodiments, a cellular network is described. The network may comprise a base station comprising a radio unit and an antenna. The network may comprise a cloud-computing platform comprising a plurality of centralized units. The network may comprise a server system in communication with the radio unit at the base station and communicatively connected via a network with the cloud-computing platform. The server system comprising a first virtual machine and a second virtual machine installed and executing thereon. The first virtual machine may execute a first distributed unit software package that configures the first virtual machine to transmit digital data between the radio unit and a first centralized unit of the plurality of centralized units. The second virtual machine may execute a second distributed unit software package that configures the second virtual machine to transmit digital data between the radio unit and a second centralized unit of the plurality of centralized units. The first distributed unit software package and the second distributed unit software package may be different.

Embodiments of such a network may include one or more of the following features: the server system may further comprise a radio unit interface communicatively connecting the server system to the radio unit and configured to accept a single connection from a virtual machine installed on the server system at a time, such that: the first virtual machine only transmits the digital data between the radio unit and the first centralized unit when the first virtual machine is connected to the radio unit interface and the second virtual machine is disconnected from the radio unit interface; and the second virtual machine only transmits the digital data between the radio unit and the first centralized unit when the second virtual machine is connected to the radio unit interface and the first virtual machine is disconnected from the radio unit interface.

In some embodiments, the cloud-computing platform may comprises a control unit configured to transmit a configuration to the second virtual machine in response to the second virtual machine being installed and executed on the server system. The first distributed unit software package may be created by a first source specific to the first centralized unit. The second distributed unit software package may be created by a second source specific to the second centralized unit and the control unit. The first virtual machine and the second virtual machine may be installed and executed on the server system remotely. The cloud-computing platform may further comprises a distributed unit management service configured to remotely install and execute the first virtual machine and the second virtual machine on the server system.

The cellular network may further comprise a first virtual private network configuration configured to enable the first virtual machine to communicate with the first centralized unit, and a second virtual private network configuration configured to enable the second virtual machine to communicate with the second centralized unit. The server system may be in further communication with a second radio unit and may further comprise a third virtual machine installed and executing thereon. The third virtual machine may execute either: a copy of the first distributed unit software package that configures the third virtual machine to transmit digital data between the second radio unit and the first centralized unit of the plurality of centralized units; a copy of the second distributed unit software package that configures the third virtual machine to transmit digital data between the second radio unit and the second centralized unit of the plurality of centralized units; or a third distributed unit software package that configures the third virtual machine to transmit digital data between the second radio unit and a third centralized unit of the plurality of centralized units. the cellular network may further comprise a plurality of base stations comprising the base station and a second base station. The second radio unit may be at the second base station of the plurality of base stations. The server system may be installed at a local data center that is geographically remote from the base station and the cloud-computing platform.

In some embodiments, a method for updating distributed units (DUs) in a cellular network is described. The method may comprise installing a base station. The base station may comprises a radio unit and an antenna. The method may comprise instantiating, on a cloud-computing platform, a plurality of centralized units. The method may comprise installing a server system comprising a radio unit interface. The radio unit of the base station may be connected to the radio unit interface of the server system. The server system may be connected with the cloud-computing platform via a network. The method may comprise executing a first virtual machine on the server system. The first virtual machine may be connected to the radio unit via the radio unit interface. The first virtual machine may execute a first DU software package that configures the first virtual machine to transmit data between the radio unit and a first centralized unit of the plurality of centralized units via the radio unit interface. The method may comprise installing a second virtual machine on the server system. The second virtual machine may comprise a second DU software package that configures the second virtual machine to transmit data between the radio unit and a second centralized unit of the plurality of centralized units. The first DU software package and the second DU software package may be different. The method may comprise executing the second virtual machine on the server system while the first virtual machine is executing. The method may comprise disconnecting the first virtual machine from the radio unit interface. The method may comprise, thereafter, connecting the second virtual machine to the radio unit interface.

Embodiments of such a method may include one or more of the following features: the radio unit interface may be configured to accept a single connection from a virtual machine installed on the server system at a time, such that: the first virtual machine only transmits the data between the radio unit and the first centralized unit when the first virtual machine is connected to the radio unit interface and the second virtual machine is disconnected from the radio unit interface; and the second virtual machine only transmits the data between the radio unit and the first centralized unit when the second virtual machine is connected to the radio unit interface and the first virtual machine is disconnected from the radio unit interface.

The method may further comprise transmitting a configuration to the second virtual machine from a control unit on the cloud-computing platform in response to the second virtual machine being installed and executed on the server system. The first DU software package may be created by a first source specific to the first centralized unit. The second DU software package may be created by a second source specific to the second centralized unit and the control unit. The first virtual machine and the second virtual machine may be installed and executed on the server system remotely. The method may further comprise installing, on the cloud-computing platform, a distributed unit management service configured to remotely install and execute the first virtual machine and the second virtual machine on the server system.

The method may further comprise installing a first virtual private network configuration configured to enable the first virtual machine to communicate with the first centralized unit. The method may further comprise installing a second virtual private network configuration configured to enable the second virtual machine to communicate with the second centralized unit. The method may further comprise connecting a second radio unit to the radio unit interface of the server system. The method may further comprise installing a third virtual machine on the server system. The third virtual machine may comprises: a copy of the first DU software package that configures the third virtual machine to transmit digital data between the second radio unit and the first centralized unit of the plurality of centralized units; a copy of the second DU software package that configures the third virtual machine to transmit digital data between the second radio unit and the second centralized unit of the plurality of centralized units; or a third DU software package that configures the third virtual machine to transmit digital data between the second radio unit and a third centralized unit of the plurality of centralized units. The method may further comprise connecting the third virtual machine to the radio unit interface. The method may further comprise installing a plurality of base stations. The plurality of base stations may comprise a second base stations. The second radio unit may be installed at the second base station of the plurality of base stations. The server system may be installed at a local data center that is geographically remote from the base station and the cloud-computing platform

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
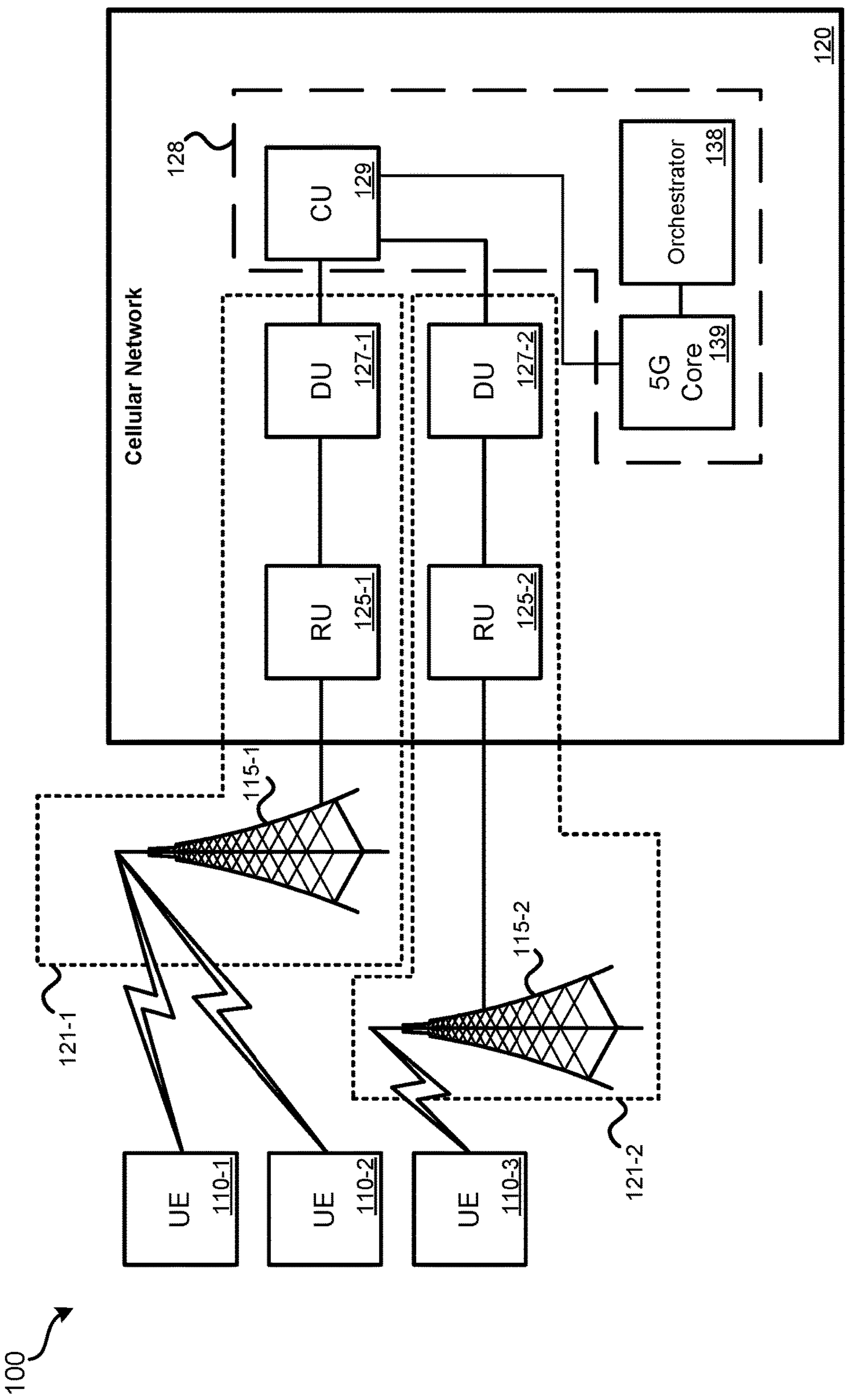
FIG. 1 illustrates an embodiment of a cellular network.

Modern cellular networks are composed of many base stations (BSs), which provide cellular network coverage to respective geographic regions within relatively close proximity to each individual base station. Each BS has some form of structure on which one or more antennas are mounted. The antennas are connected to a radio unit (RU), which is connected to a distributed unit (DU). Conventionally, DUs included special-purpose physical hardware located on site at a BS, or within close proximity to a BS.

Continuing to use special-purpose DU hardware may be a simple solution for many existing cellular networks and cellular network providers. However, arrangements detailed herein may be more flexible and scalable, easier to maintain and upgrade, and provide better fault tolerance than conventional arrangements.

As detailed herein, some BSs of a 5G New Radio (NR) cellular network, and their associated RUs, may be connected to a server system, composed primarily of general-purpose computing platforms, instead of special-purpose DU hardware. Rather, the same DU functionalities may be provided by virtual machines (VMs) executing within the server system and configured to emulate special-purpose DU hardware. By emulating special-purpose DU hardware, the same special-purpose DU software, or a slightly modified version, may be executed within a VM on general-purpose hardware. With sufficient processing power and data storage capabilities, the general-purpose server system can support the execution of multiple VMs at the same time.

Concurrently executing multiple VMs, with each VM executing special-purpose DU software, on general-purpose server systems, may provide numerous benefits, including the ability to maintain high quality of service (QoS) and quality of experience (QoE) standards while performing maintenance or upgrades to the cellular network. For example, compared with the time and/or labor intensive task of physically replacing or servicing special purpose DU hardware at each individual BS, multiple VMs may be remotely installed and executed on the same general-purpose hardware at the same time. At the appropriate time, without changing any physical connections (e.g., to/from an RU), a logical RU interface may be switched from one VM to the next thereby establishing a new connection between the RU and the appropriate VM executing special-purpose DU software. By reducing the time and labor associated with physically replacing DUs, network-wide upgrades, such as from one DU vendor to another, may become more feasible and cost effective.

Providing DU functionality using VMs on a general-purpose server system may also improve the overall fault tolerance of the cellular network. For example, after switching from an initial VM to a new VM, the initial VM may be left executing until it is determined that there are no issues with the new VM. In the event that the new VM does not operate as expected, the logical connection to the RU can be reverted to the initial VM until the issues with the new VM are resolved. In addition, by transitioning to software-based solutions, human error associated with maintenance and upgrades to special-purpose hardware may be completely ameliorated. Finally, by automating VM and DU software installation within a central management service, the process of upgrading, updating, or replacing DUs may be completely automated and/or standardized.

Further detail regarding such embodiments and other embodiments is provided in relation to the figures. FIG. 1 illustrates an embodiment of a cellular network system 100 ("system 100"). FIG. 1 represents an embodiment of a cellular network which can accommodate the architecture of FIGS. 2-4. System 100 can include a 5G New Radio (NR) cellular network; other types of cellular networks, such as 6G, 76, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various base stations of cellular network 120. As illustrated, two base stations are illustrated: base station 121 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other man-made or natural structure to which one or more antennas can reasonably be mounted to provide cellular coverage to a geographic area. Similarly, base station 121-2 can include: structure 115-2, RU 125-2, and DU 127-2.

Real-world implementations of system 100 can include many (e.g., thousands) of base stations and many CUs and 5G core 139. BS 121-1 can include one or more antennas that allow RUs 125 to communicate wirelessly with UEs 110. RUs 125 can represent an edge of cellular network 120 where data is transitioned to or from wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible O-RAN implementation, DUs 127, CU 129, 5G core 139, and/or orchestrator 138 can be implemented virtually as software being executed by general-purpose computing equipment, such as in a data center, as detailed herein. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the quality of service (QoS) and quality of experience (QoE) for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
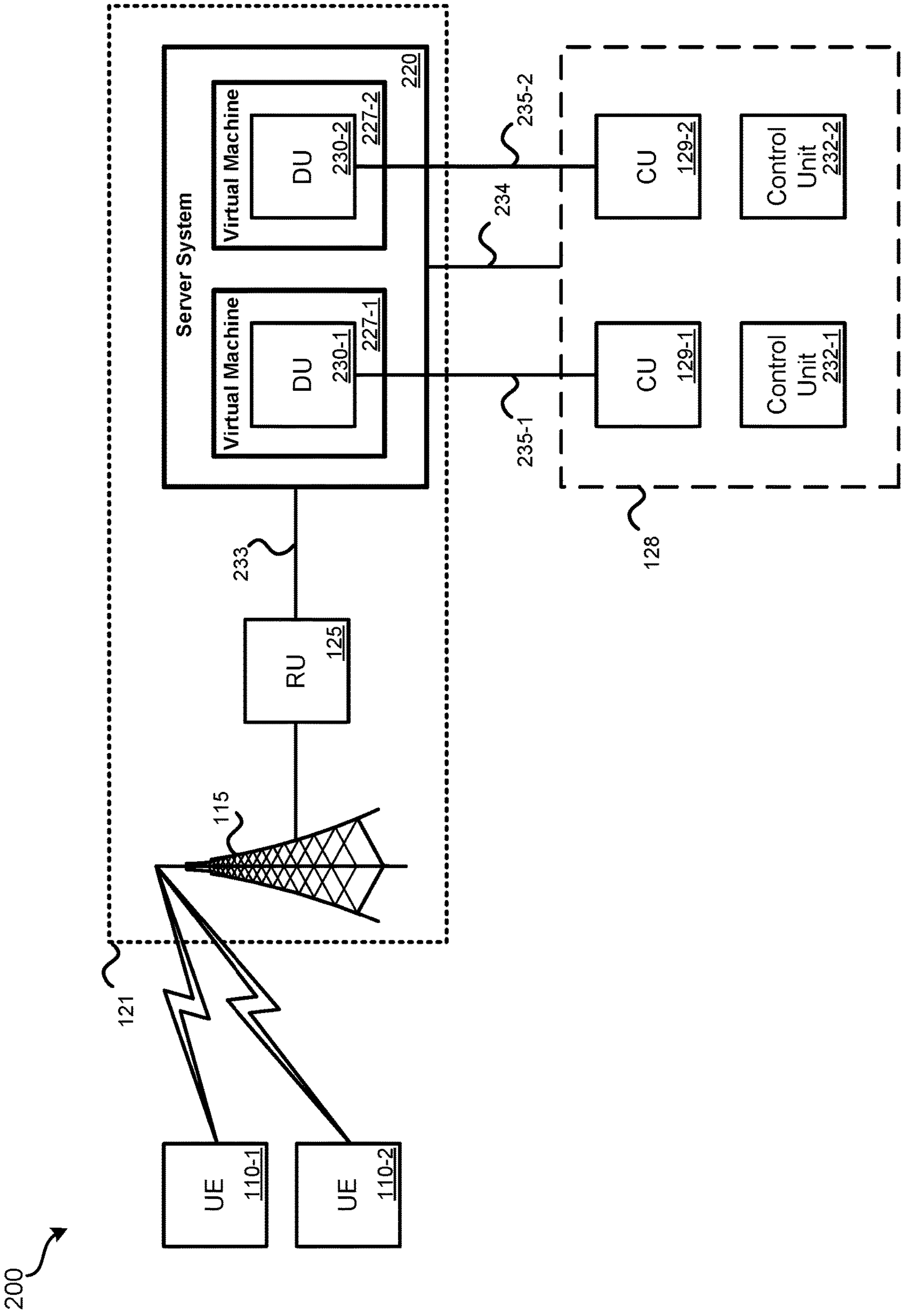
FIG. 2 illustrates an embodiment of a cellular network that includes a server system that hosts multiple distributed units (DUs).

While FIG. 1 illustrates an embodiment of a 5G NR cellular network, the specific architecture of the cellular network may vary. FIG. 2 illustrates an embodiment of a cellular network system 200 ("system 200") that includes a server system that hosts multiple distributed units (DUs). System 200 can include: UE 110; structure 115; base station 121; RU 125; server system 220; virtual machines 227 (VMs 227); DUs 230; cloud-based cellular network components 128; CUs 129; and control units 232.

Base station 121 can include: structure 115; RU 125; and server system 220. Structure 115 may be any structure to which one or more antennas are mounted, as further described above. RU 125 can function in the same, or a similar, manner as described above. For example, RU 125 can transmit and receive digital data to and from UE 110. While illustrated as including a single base station 121, system 200 may include a plurality of base stations with some or all of the same components. For example, system 200 can include a second base station including one or more additional RUs, a structure, and an additional independent server system. Additionally, or alternatively, system 200 can include one or more base stations comprising fewer components than base station 121. For example, system 200 can include a third base station including only a structure and an RU supported by a remote server system, such as server system 220, at another base station, such as base station 121.

Server system 220 may represent one or more computer servers, that include multiple processors and one or more non-transitory processor-readable mediums, on which special-purpose software can be executed. Server system 220 can include one or more physical computers, such as laptop, desktop, or rack mounted computers. Server system 220 can include one or more processors within the same physical enclosure or distributed across multiple enclosures, as in a distributed server system. Server system 220 may also include storage or memory configured to store one or more software packages, an operating system, and the like. While illustrated as being included in base station 121, server system 220 can be geographically remote from the remaining components of base station 121, such as RU 125 and structure 115, as further described below.

Server system 220 can include one or more physical interfaces configured to accept such connections as fiber optic cables, coaxial cables, Ethernet cables, and the like. The one or more physical interfaces may configure server system 220 to be in communication with other components of system 200, such as RU 125 and cloud-based cellular network components 128. For example, server system 220 may be in communication with RU 125 via fiber optic connection 233. Fiber optic connection 233 can allow for encoded, but not necessarily encrypted, data to be transmitted between RU 125 and server system 220. Since the data remains encoded to be transmitted by or received from an RU, the data is essentially as secure as the RF signal transmitted between the RU and the UE. Therefore, additional encryption may not be necessary. In other embodiments, an additional layer of encryption between an RU and corresponding server system over the fiber optic connection may be added for increased security. While the embodiments herein are focused on fiber optic connections, other forms of transport for high-bandwidth digital data may additionally or alternatively be used, such as a microwave communication link.

As another example, server system 220 may be in communication with cloud-based cellular network components 128 via network 234. Network 234 may include a fiber network. For example, while the connection between light RU 125 and server system 220 may be a dedicated point-to-point communication link on which addressing is not necessary, server system 220 may also operate on a fiber network on which addressing is required. Multiprotocol label switching (MPLS) segment routing (SR) may be used to perform routing over a network (e.g., fiber optic network) between server system 220 and cloud-based cellular components 128. Such segment routing can allow for packetized data to be steered based on a list of instructions carried in the packet header. This arrangement allows for the source from where the packet originated to define a route through one or more nodes that will be taken to cause the packet to arrive at its destination. Use of SR can help ensure network performance guarantees and can allow for network resources to be efficiently used. While MPLS SR can be used for the network connection between server system 220 and cloud-based cellular network components 128, it should be understood that other protocols and non-fiber-based networks can be used for network 234.

Server system 220 can include an operating system, kernel, or other system level software configured to provide an interface between the various hardware components of server system 220, such as processors and memory, and higher level software. The system level software may be configured to support one or more server or computer virtualization functions. For example, server system 220 may include a hypervisor, or other similar emulator, comprising software, firmware, or hardware configured to create and run virtual machines, such as VMs 227, on virtual operating platforms.

VMs 227 can include virtualized computer systems based on computer architectures. VMs 227 can provide the same, or similar, functionality as a physical computer using software components to emulate computer architectures. For example, VM 227-1 may be configured to emulate a first computer architecture while VM 227-2 may be configured to emulate a second, different, computer architecture. Server system 220 may execute VMs 227 at the same time. For example, an operating system or kernel, such as a hypervisor, executing on server system 220 may allocate, or otherwise coordinate, the concurrent use of the physical resources, such as the physical processors, memory, and data storage, of server system 220 between VM 227-1 and VM 227-2. Server system 220 may install and execute VMs 227 from an image format. For example, server system 220 may be configured, such as by a hypervisor, to install VMs 227 from a virtual appliance image or a virtual machine image. After installing and/or executing VMs 227, server system 220 may further configure VMs 227, enable VMs 227 to configure themselves, or provide functionalities that enable a remote service or user to further configure VMs 227, as further described below.

As described above, DUs and CUs can be implemented virtually as software being executed by general-purpose computing equipment. As such, VMs 227 may be configured to emulate special-purpose DU hardware. Special-purpose DU hardware may be vendor, or source, specific. For example, a first DU vendor may design a first DU using a first set of hardware components while a second DU vendor may design a second DU using a second, different, set of hardware components. VMs 227 may be designed to emulate the hardware components associated with a particular vendor's special-purpose DU hardware. For example, VM 227-1 may include a first set of emulators configured to emulate a first vendor's DU hardware while VM 227-2 may include a second, different, set of emulators configured to emulate a second vendor's DU hardware. As another example, VM 227-1 may include a first set of emulators configured to emulate a first vendor's DU hardware while VM 227-2 may include a second, different, set of emulators configured to emulate an updated combination of hardware components from the first vendor.

VMs 227 may include DU software packages 230. DU software packages 230 may include the same or similar software designed for execution by special-purpose DU hardware. For example, each DU vendor of a plurality of DU vendors may design software intended to configure special-purpose DU hardware to transmit digital data between a radio unit and a centralized unit. By emulating the special-purpose DU hardware with VMs 227, the DU software may be installed and executed on VMs 227 as if VMs 227 were the special-purpose DU hardware, thereby configuring VMs 227 to transmit digital data between a radio unit and a centralized unit. Additionally, or alternatively, DU software packages 230 may include modifications to the DU software designed for special-purpose DU hardware in order to optimize DU software packages 230 for execution by virtual machines, such as VMs 227.

As described above, cloud-based cellular network components 128 can include one or more CUs, such as CUs 129. CUs 129 may be the same, or operate in a similar manner, as described above. In some embodiments, CUs 129, DUs 127, and DU software packages 230, are vendor specific. In other words, DU software package 230-1 created by a first vendor may only configure VM 227-1 to transmit digital data between RU 125 and CUs created by the first vendor, such as CU 129-1, and vice versa. Similarly, CU 129-2 created by a second vendor may only be configured to communicate with a DU, or virtual DU executing as software on a virtual machine, created by the second vendor, such as DU software package 230-2 executing within VM 227-2, and vice versa.

As described above, server system 220 may be in communication with cloud-based cellular network components 128 via network 234. In addition, one or more virtual private networks (VPNs) may be established within network 234 to enable DU software packages 230, and/or their respective VMs 227, to be in communication with CUs 129. The one or more VPNs may be established according to individual VPN configurations 235. VPN configurations 235 may define the logical connections between VMs 227, and/or DU software packages 230, and CUs 129. For example, VPN configurations 235 may include definitions for virtual local area networks (VLANs) or virtual routing and forwarding (VRF) configurations within network 234. Each DU software package 230 and CU 129 pair may require a unique VPN configuration 235 depending on the respective vendor and/or source. For example, VPN configuration 235-1 may be configured to enable VM 227-1, and/or DU software package 230-1, to communicate with centralized unit 129-1. Similarly, VPN configuration 235-2 may be configured to enable VM 227-2, and/or DU software package 230-2, to communicate with centralized unit 129-2.

Cloud-based cellular network components 128 may include control units 232. Control units 232 may represent one or more cloud-based servers and/or services configured to transmit DU configurations to VMs 227 in response to their being installed and executed on server system 220. Control units 232 may be vendor specific. For example, control unit 232-1 may be designed and/or created by a first vendor in order to provide DU configurations for DU software packages also created by the first vendor, such as DU software package 230-1. Similarly, control unit 232-2 may be designed and/or created by a second vendor in order to provide DU configurations for DU software packages also created by the second vendor, such as DU software package 230-2. Upon installation, DU configurations provided by control units 232 may enable VMs 227 to configure DU software packages 230 to establish communications with their respective CUs 129. For example, a DU configuration from control unit 232-1 may enable VM 227-1 to transmit data using VPN configuration 235-1. Control units 232 may be connected to server system 220 over network 234 without using VPN configurations 235.

Cellular network architectures as illustrated and described in relation to system 200 provide numerous benefits. By emulating physical DU hardware on virtual machines, the costs associated with DU maintenance, repair, and replacement may be ameliorated. For example, instead of physically repairing or replacing a DU on site at a base station or data center, updated DU software packages and/or virtual machines may be installed remotely on general-purpose computer hardware. Similarly, due to the number of base stations within large cellular networks, replacing DUs from one vendor with DUs from another vendor across large portions of the cellular network can be done in a matter of hours from a central location.

Figure 3:
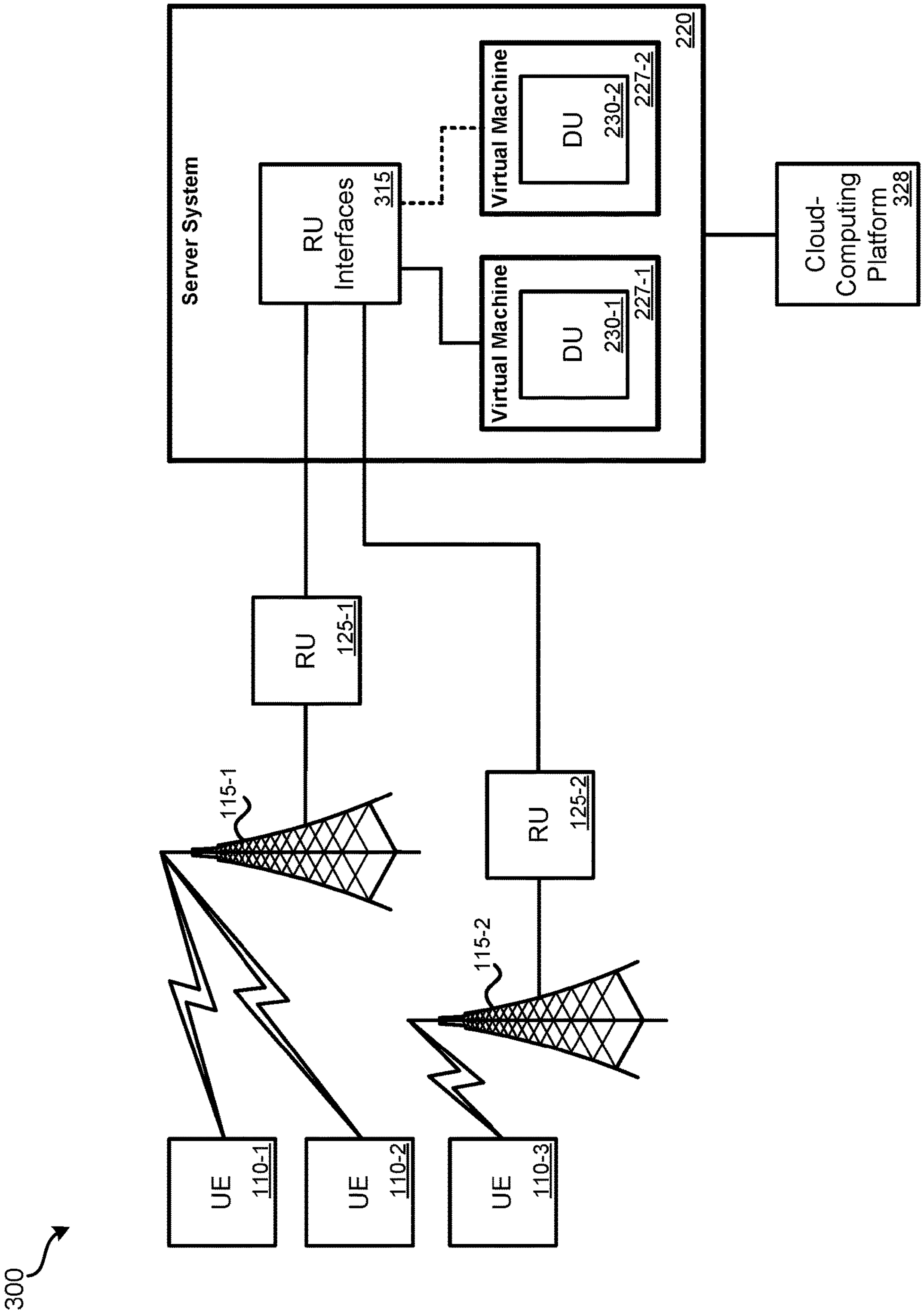
FIG. 3 illustrates an embodiment of a cellular network that includes a server system in communication with multiple Radio Units (RUs).

FIG. 3 illustrates an embodiment of a cellular network system 300 ("system 300") that includes a server system in communication with multiple RUs. System 300 can include: UE 110; structures 115; RUs 125; server system 220; and cloud-computing platform 328. RUs 125 and structures 115 may represent multiple individual base stations, such as base stations 121, as described above. RUs 125 may be in communication with server system 220 via fiber optic connections, as described above. Server system 220 and RUs 125 may each be in different locations. For example, server system 220 may be located at a local data center within a predefined distance from RUs 125.

Server system 220 may be the same, or function in a similar manner, as described above. For example, as illustrated, server system 220 includes virtual machines 227 with DU software packages 230 installed thereon. Each of VMs 227, and their respective DU software packages 230, may be created, designed, and/or configured by different vendors, as described above. Each of VMs 227, and their respective DU software packages 230, may be installed on server system 220 as part of a DU functionality upgrade or replacement. For example, the DU functionalities provided by server system 220 may be in the process of being switched from one vendor to a different vendor.

Additionally, or alternatively, each of VMs 227, and their respective DU software packages 230, may be installed on server system 220 to support different RUs. For example, as illustrated, VM 227-1 may initially be installed on server system 220 to support RU 125-1. VM 227-2 may subsequently be installed on server system 220 to support RU 125-2.

In some embodiments, server system 220 includes RU interfaces 315. RU interfaces 315 may include one or more physical and/or logical interfaces configured to accept connections from RUs 125. Additionally, or alternatively, RU interfaces 315 may represent one or more services configured to manage the physical and/or logical interfaces with RUs 125. For example, RU interfaces 315 may establish connections between RU 125-1 and VM 227-1, and RU 125-2 and VM 227-2. As another example, RU interfaces 315 may disconnect RU 125-1 from VM 227-1 and reconnect RU 125-1 to VM 227-2 after it has been installed and configured with DU software package 230-2, as further described above.

Server system 220 may be in communication with cloud-computing platform 328. A network, such as network 234 described above, may enable server system 220 to communicate with cloud-computing platform 328. Cloud-computing platform 328 may be a private cloud environment hosted at one or more data centers. Additionally, or alternatively, cloud-computing platform 328 may be a part of a commercially available cloud-based system, such as AWS®, Azure®, Google Cloud®, or the like. Cloud-computing platform 328 may include some or all of the same components as cloud-based cellular network components 128 described above. For example cloud-computing platform 328 may include one or more CUs, control units, 5G cores, and orchestrators.

Figure 4:
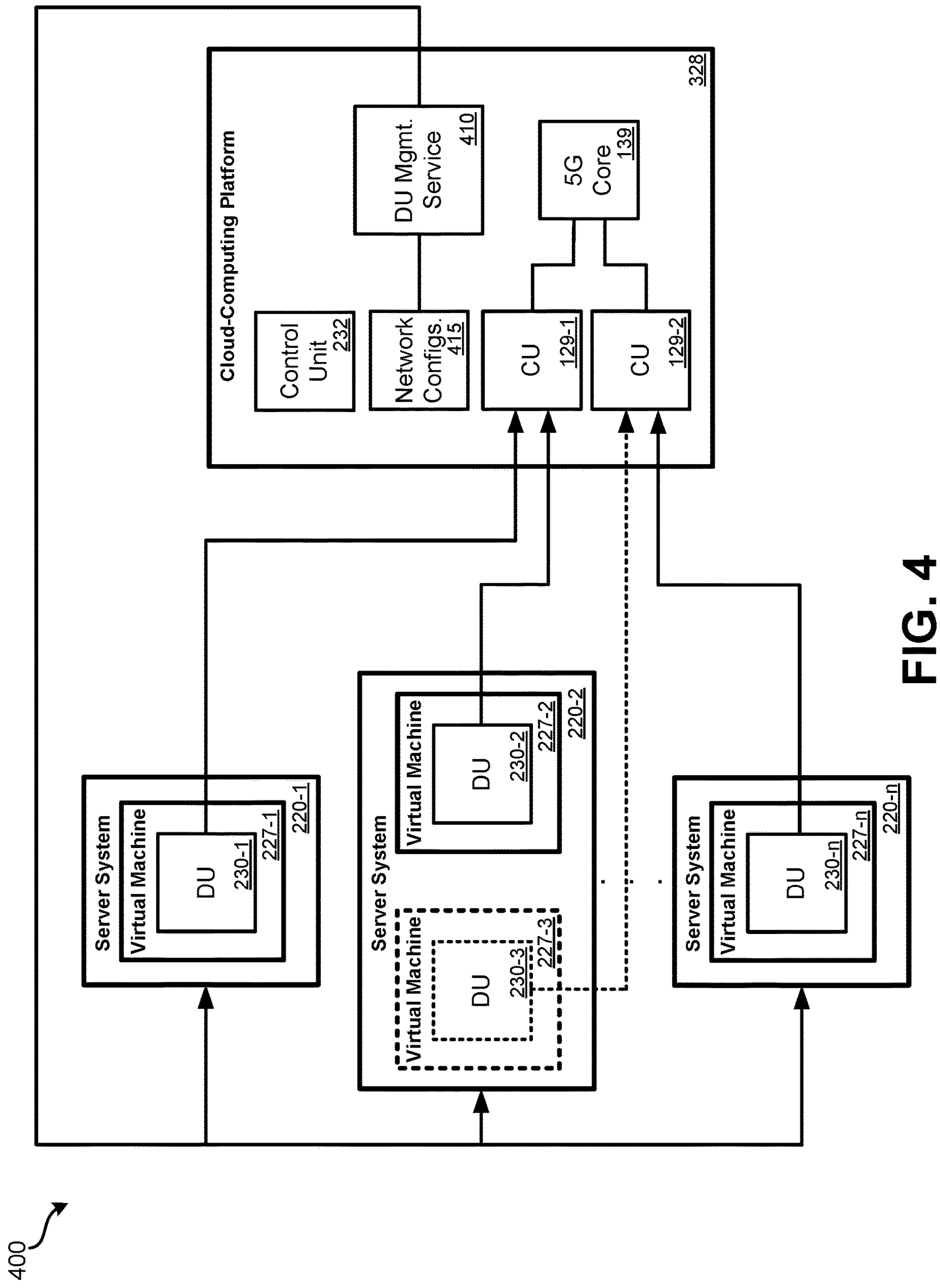
FIG. 4 illustrates an embodiment of a cellular network that includes multiple server systems.

FIG. 4 illustrates an embodiment of cellular network system 400 ("system 400") that includes multiple server systems. System 400 can include server systems 220 and cloud-computing platform 328. Server systems 220 may be the same, or function in a similar manner, as described above. For example, each server system 220 may provide DU functionalities to one or more respective RUs or base stations, as further described above. As illustrated, the number of server systems 220 in system 400 can be scaled up or down as needed to support any number of base stations (not illustrated) included in system 400.

Cloud-computing platform 328 may be the same, or function in a similar manner, as described above. For example, cloud-computing platform 328 may include CUs 129, 5G core 139, and one or more control units, such as control unit 232. As illustrated, DU software package 230-1 of VM 227-1 and DU software package 230-2 of VM 227-2 are in communication with CU 129-1 while DU software package **230-*n* of VM 227-*n* is in communication with CU 129-2**.

Cloud-computing platform 328 may further include DU management service 410 and network configurations 415. DU management service 410 may install, manage, and remove VMs 227 and/or DU software packages 230 from server systems 220. For example, as illustrated, DU management service 410 may install VM 227-3, including DU software package 230-3, on server system 220-2. VM 227-3 and DU software package 230-3 may be installed on server system 220-2 as part of a system upgrade. For example, VM 227-2 and DU software package 230-2, created by a first vendor, may be replaced with VM 227-3 and DU software package 230-3 created by a second, different, vendor. Alternatively, VM 227-3 and DU software package 230-3 may be newer versions of VM 227-2 and DU software package 230-2 created by the same vendor to add new features and functionalities, or to address existing defects in the older versions.

DU management service 410 may allocate, or otherwise manage, the resources on cloud-computing platform 328 to support server systems 220. For example, before or after installing VM 227-3 on server system 220-2, DU management service 410 may allocate a CU of CUs 129 to support DU software package 230-3 once it has been installed and is executing within VM 227-3. As illustrated, DU management service 410 may allocate CU 129-2 to DU software package 230-3. CU 129-2 may be allocated to DU software package 230-3 after determining that DU software package 230-3 and CU 129-2 are from a first vendor while DU software package 230-2 and CU 129-1 are from a second vendor.

DU management service 410 may instantiate new CUs 129 as necessary to support server systems 220. For example, before or after installing VM 227-3 on server system 220-2, DU management service 410 may determine that there are no available CUs within cloud-computing platform 328 to support DU software package 230-3. This may be the case when, for example, each existing CU is already connected to a maximum number of DUs or DU software packages 230. Alternatively, this may be the case when a new DU software package is to be installed from a new vendor for which there are no existing CUs instantiated within cloud-computing platform 328. DU management service 410 may coordinate with one or more additional services operating on cloud-computing platform 328 to instantiate new CUs 129. For example, each CU/DU vendor may provide an independent service or function that enables DU management service 410 to request and/or instruct that a new CU be instantiated within cloud-computing platform 328. In some embodiments, one or more control units 232, as described above, may provide the necessary services to instantiate new CUs in addition to providing DU configurations to VMs 227 as they are installed on server systems 220.

As described above, VMs 227 may be in communication with CUs 129 using one or more VPNs within a larger network connecting server systems 220 to cloud-computing platform 328. DU management service 410 may create, manage, and/or reconfigure VPNs to support new or existing DU software packages 230 as they are installed on server systems 220. For example, before or after installing VM 227-3 on server system 220-2, DU management service 410 may create a new VPN within which VM 227-3 and CU 129-2 may communicate. Alternatively, DU management service 410 may reconfigure an existing VPN, such as a VPN within which VM 227-*n* and CU 129-2 are already in communication, to support the addition of VM 227-3. Network configurations 415 may enable DU management service 410 to create and/or reconfigure VPNs. For example, network configurations 415 may include a library of new or existing network configurations from which DU management service 410 may select a network configuration for allocation to new VM/CU pairs. Alternatively, network configurations 415 may include one or more services configured to accept, as inputs, details relating to a new VM/CU pair, and create new VPNs, or reconfigure existing VPNs, as necessary to support the new VM/CU pair.

Figure 5:
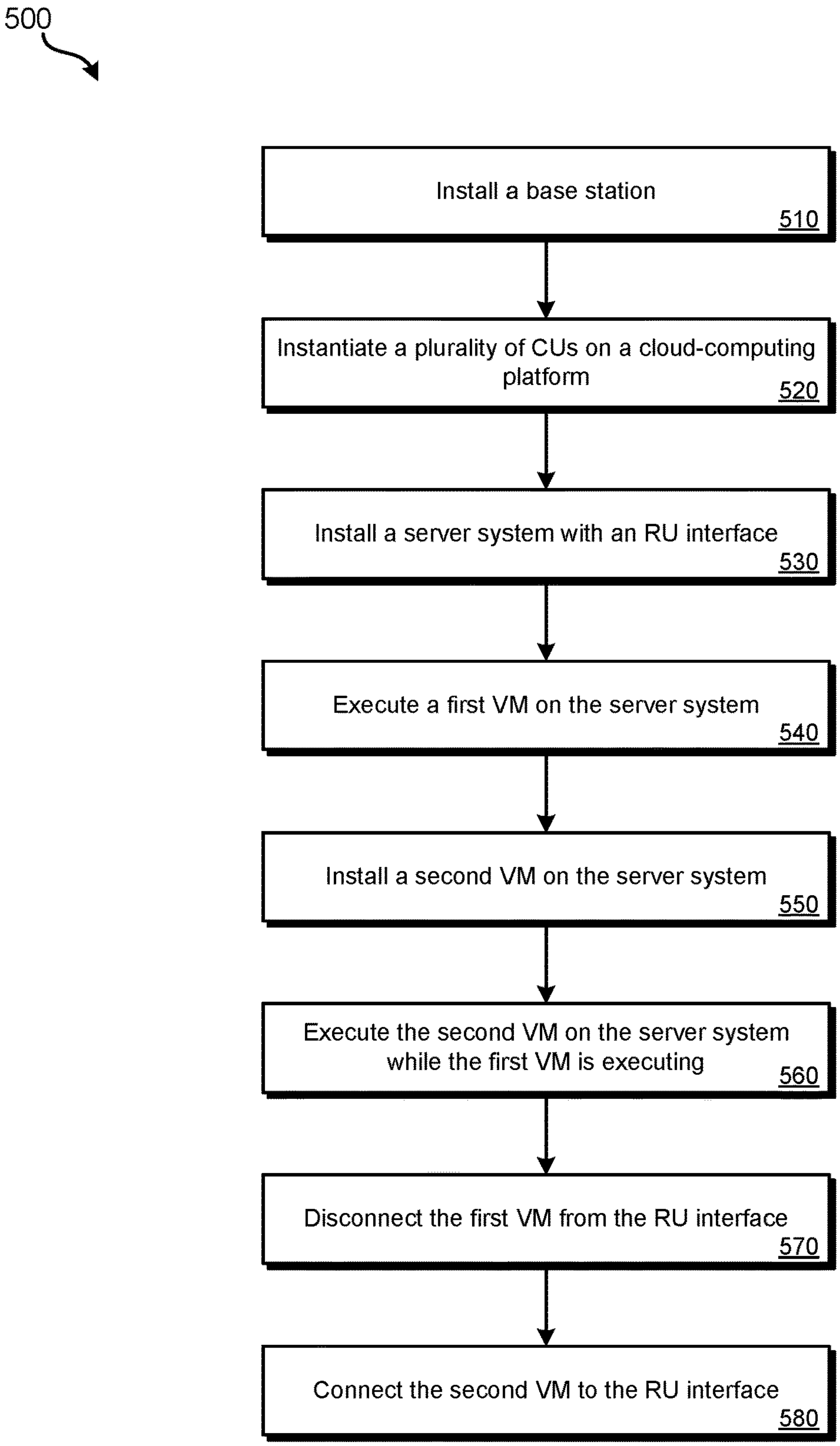
FIG. 5 illustrates an embodiment of a method for updating DUs in a cellular network.

Various methods may be performed using the systems and arrangements of FIGS. 1-4. FIG. 5 illustrates an embodiment of a method 500 for updating DUs in a cellular network. Method 500 can be performed using cellular network systems 100, 200, 300, and 400. At block 510, a base station may be installed. As described above, the base station may include an RU and an antenna. The base station may be part of a larger network of cellular base stations including a plurality of base stations.

At block 520, a plurality of CUs may be instantiated on a cloud-computing platform. Each CU of the plurality of CUs may be instantiated to support one or more base stations, such as the base station of block 510. Additionally, or alternatively, multiple CUs from different vendors may be instantiated to support other vendor specific components, such as DUs or DU software packages, as described above. The cloud-computing platform may include additional components, as described above in reference to FIG. 4, such as a 5G core, a DU management service, and the like.

At block 530, a server system with an RU interface may be installed. The server system may be installed at the base station or geographically distant from the base station. For example, the server system may be installed at a local data center within a predefined distance to one or more base stations. In this configuration, the server system may be able to support multiple base stations. The radio unit interface of the server system may represent one or more physical and/or logical interfaces as described above in reference to FIG. 3. The radio unit of the base station may be connected to the RU interface of the server system. For example, the RU of the base station may be physically connected to the server system via a fiber optic connection. The server system may also be connected with the cloud-computing platform via a network.

At block 540, a first VM may be executed on the server system. The first VM may be connected to the RU of the base station via the RU interface of the server system. The connection between the first VM and the RU may be a logical or software connection, such as a socket connection or a port forwarding function, managed by the RU interface. The first VM may execute a first DU software package, as described above. For example, the first DU software package may configure the first VM to transmit data between the RU and a first CU of the plurality of CUs via the RU interface. Together, the first VM and the first CU may form a first VM/CU pair, similar to a DU/CU pair wherein the CU supports the DU functionality provided by the DU software package executing in the first VM. The first CU may also be paired with a number of other VMs and/or physical DUs in a many-to-one relationship (e.g., many VMs to one CU). Pairing VMs, and their DU software packages, with CUs may involve vendor specific pairing. For example, CUs created or designed by a first vendor may only be configured to support DUs or DU software packages also created or designed by the first vendor. Accordingly, the first CU and the first DU software package executing within the first VM may each be created by the same vendor or component source.

At block 550, a second VM may be installed on the server system. The second VM may include a second DU software package that configures the second VM to transmit data between the radio unit of the base station and a second CU of the plurality of CUs. Similar to the first VM/CU pair, the second VM and the second CU may form a second VM/CU pair based on a common vendor or source responsible for creating the second DU software package and the second CU. As described above in relation to FIG. 2, communication within the first VM/CU pair and communication within the second VM/CU pair may occur within VPNs according to vendor specific VPN configurations. Accordingly, as part of installing the second VM, method 500 may include reconfiguring the network between the server system and the cloud-computing platform to support the VPN connection between the second VM and the second CU. Further, while described as already being instantiated prior to the second VM being installed, the second CU may be instantiated within the cloud-computing platform before or after the second VM is installed on the server system. For example, while the plurality of CUs instantiated on the cloud-computing platform may include one or more CUs created by the same vendor as the second DU software package, the existing CU instances may not be capable of supporting any additional VM pairing. In this example, the second CU may be instantiated prior to, or after, installing the second VM on the server system.

At block 560, the second VM may be executed on the server system while the first VM is executing. The server system may include a hypervisor, or other similar computer platform emulator, capable of executing multiple VMs, such as the first VM and the second VM, at the same time. At block 570, the first VM may be disconnected from the RU interface, and at block 580, the second VM may then be connected to the RU interface. Once the first VM has been disconnected and the second VM has been connected, cellular network data may begin flowing from the RU to a 5G core through the second VM/CU pair.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A cellular network, comprising:
- a base station comprising a radio unit and an antenna;
- a cloud-computing platform comprising a plurality of centralized units; and
- a server system communicatively connected via a network with the cloud-computing platform, wherein the server system comprises:
  - a radio unit interface installed and executing on the server system, through which communication between the radio unit and a virtual machine executing on the server system passes; and
  - a first virtual machine and a second virtual machine installed and concurrently executing on the server system, wherein:
    - the first virtual machine executes a first distributed unit software package that configures the first virtual machine to transmit digital data between the radio unit and a first centralized unit of the plurality of centralized units;
    - the second virtual machine executes a second distributed unit software package that configures the second virtual machine to transmit digital data between the radio unit and a second centralized unit, different from the first centralized unit, of the plurality of centralized units;
    - the first distributed unit software package and the second distributed unit software package are different; and
    - the radio unit interface only permits a single virtual machine installed on the server system to be connected to the radio unit at any given time and is configured to establish the connection between the radio unit and the single virtual machine, such that the radio unit is switchable by the radio unit interface from the first virtual machine to the second virtual machine while the first virtual machine and the second virtual machine remain installed and executing on the server system.

2. The cellular network of claim 1, wherein:
- the first virtual machine only transmits the digital data between the radio unit and the first centralized unit when the first virtual machine is connected to the radio unit by the radio unit interface and the second virtual machine is disconnected from the radio unit by the radio unit interface; and
- the second virtual machine only transmits the digital data between the radio unit and the second centralized unit when the second virtual machine is connected to the radio unit by the radio unit interface and the first virtual machine is disconnected from the radio unit by the radio unit interface.

3. The cellular network of claim 1, wherein the cloud-computing platform further comprises a control unit service installed thereon that transmits a configuration to the second virtual machine in response to the second virtual machine being installed and executed on the server system.

4. The cellular network of claim 3, wherein:
- the first distributed unit software package is created by a first source specific to the first centralized unit; and
- the second distributed unit software package is created by a second source specific to the second centralized unit and the control unit service.

5. The cellular network of claim 1, wherein the first virtual machine and the second virtual machine are installed and executed on the server system remotely.

6. The cellular network of claim 5, wherein the cloud-computing platform further comprises a distributed unit management service installed thereon that remotely installs and executes the first virtual machine and the second virtual machine on the server system.

7. The cellular network of claim 1, wherein the server system is in further communication with a second radio unit via the radio unit interface installed on the server system and the server system further comprises a third virtual machine installed and executing thereon, wherein the third virtual machine executes either:

a copy of the first distributed unit software package that configures the third virtual machine to transmit digital data between the second radio unit and the first centralized unit of the plurality of centralized units;

a copy of the second distributed unit software package that configures the third virtual machine to transmit digital data between the second radio unit and the second centralized unit of the plurality of centralized units; or a third distributed unit software package that configures the third virtual machine to transmit digital data between the second radio unit and a third centralized unit of the plurality of centralized units.

8. The cellular network of claim 7, wherein the cellular network further comprises a plurality of base stations comprising the base station and a second base station, and wherein the second radio unit is at the second base station of the plurality of base stations.

9. The cellular network of claim 1, wherein the server system is installed at a local data center that is geographically remote from the base station and the cloud-computing platform.

10. A method for updating distributed units (DUs) in a cellular network, the method comprising:

installing a base station, wherein the base station comprises a radio unit and an antenna;

instantiating, on a cloud-computing platform, a plurality of centralized units;

installing a server system, wherein:

the server system is connected with the cloud-computing platform via a network; and the server system comprises a radio unit interface installed and executing on the server system, through which communication between the radio unit and a virtual machine executing on the server system passes;

connecting the radio unit of the base station to the radio unit interface of the server system;

executing a first virtual machine on the server system, wherein:

the first virtual machine executes a first DU software package that configures the first virtual machine to transmit data between the radio unit and a first centralized unit of the plurality of centralized units via the radio unit interface;

connecting, by the radio unit interface, the radio unit to the first virtual machine, wherein the radio unit interface only permits a single virtual machine installed on the server system to be connected to the radio unit at any given time;

installing a second virtual machine on the server system, wherein:

the second virtual machine comprises a second DU software package that configures the second virtual machine to transmit data between the radio unit and a second centralized unit, different from the first centralized unit, of the plurality of centralized units; and the first DU software package and the second DU software package are different;

executing the second virtual machine on the server system while the first virtual machine is executing;

disconnecting, by the radio unit interface, the first virtual machine from the radio unit; and thereafter, connecting, by the radio unit interface, the second virtual machine to the radio unit.

11. The method for updating DUs in a cellular network of claim 10, wherein:

the first virtual machine only transmits the data between the radio unit and the first centralized unit when the first virtual machine is connected to the radio unit by the radio unit interface and the second virtual machine is disconnected from the radio unit by the radio unit interface; and the second virtual machine only transmits the data between the radio unit and the second centralized unit when the second virtual machine is connected to the radio unit by the radio unit interface and the first virtual machine is disconnected from the radio unit by the radio unit interface.

12. The method for updating DUs in a cellular network of claim 10, the method further comprising:

transmitting a configuration to the second virtual machine from a control unit on the cloud-computing platform in response to the second virtual machine being installed and executed on the server system.

13. The method for updating DUs in a cellular network of claim 12, wherein:

the first DU software package is created by a first source specific to the first centralized unit; and the second DU software package is created by a second source specific to the second centralized unit and the control unit.

14. The method for updating DUs in a cellular network of claim 10, wherein the first virtual machine and the second virtual machine are installed and executed on the server system remotely.

15. The method for updating DUs in a cellular network of claim 14, the method further comprising:

installing, on the cloud-computing platform, a distributed unit management service configured to remotely install and execute the first virtual machine and the second virtual machine on the server system.

16. The method for updating DUs in a cellular network of claim 10, the method further comprising:

installing a first virtual private network configuration configured to enable the first virtual machine to communicate with the first centralized unit; and installing a second virtual private network configuration configured to enable the second virtual machine to communicate with the second centralized unit.

17. The method for updating DUs in a cellular network of claim 10, the method further comprising:

connecting a second radio unit to the radio unit interface of the server system;

installing a third virtual machine on the server system, wherein the third virtual machine comprises:

a copy of the first DU software package that configures the third virtual machine to transmit digital data between the second radio unit and the first centralized unit of the plurality of centralized units;

a copy of the second DU software package that configures the third virtual machine to transmit digital data between the second radio unit and the second centralized unit of the plurality of centralized units; or a third DU software package that configures the third virtual machine to transmit digital data between the second radio unit and a third centralized unit of the plurality of centralized units; and connecting the third virtual machine to the radio unit interface.

18. The method for updating DUs in a cellular network of claim 17, the method further comprising:

installing a plurality of base stations, the plurality of base stations comprising a second base station, wherein the second radio unit is installed at the second base station of the plurality of base stations.

19. The method for updating DUs in a cellular network of claim 10, wherein the server system is installed at a local data center that is geographically remote from the base station and the cloud-computing platform.

20. The cellular network of claim 1, wherein:

a first virtual private network is established within the network between the server system and the cloud-computing platform according to a first virtual private network configuration that enables communication between the first virtual machine and the first centralized unit via the first virtual private network; and the cloud-computing platform further comprises a distributed unit management service configured to establish a second virtual private network within the network between the server system and the cloud-computing platform according to a second virtual private network configuration different from the first virtual private network configuration to enable communication between the second virtual machine and the second centralized unit via the second virtual private network.

* * * * *